(12) United States Patent
Smith (10) Patent No.: US 10,324,889 B2
(45) Date of Patent: Jun. 18, 2019

(54) SYSTEM AND METHOD TO TOLERATE RINGING ON A SERIAL DATA BUS

(71) Applicant: Demand Peripherals, Inc., Las Vegas, NV (US)

(72) Inventor: Robert Smith, Santa Clara, CA (US)

(73) Assignee: Demand Peripherals, Inc., Las Vegas, NV (US)

( * ) Notice: Subject to any disclaimer, the term of this patent is extended or adjusted under 35 U.S.C. 154(b) by 0 days.

(21) Appl. No.: 15/669,803

(22) Filed: Aug. 4, 2017

(65) Prior Publication Data
US 2018/0039599 A1 Feb. 8, 2018

Related U.S. Application Data

(60) Provisional application No. 62/371,807, filed on Aug. 7, 2016.

(51) Int. Cl.
| | | |
|---|---|---|
| *G06F 13/42* | (2006.01) | |
| *G06F 13/364* | (2006.01) | |
| *G06F 13/40* | (2006.01) | |

(52) U.S. Cl.
CPC ........ *G06F 13/4291* (2013.01); *G06F 13/364* (2013.01); *G06F 13/404* (2013.01)

(58) Field of Classification Search
CPC ... G06F 13/00; G06F 13/4282; G06F 13/4291
See application file for complete search history.

(56) References Cited

U.S. PATENT DOCUMENTS

| | | | | |
|---|---|---|---|---|
| 5,878,234 A | * | 3/1999 | Dutkiewicz | G06F 13/423 710/110 |
| 6,092,138 A | * | 7/2000 | Schutte | G06F 13/00 710/113 |
| 6,912,606 B2 | | 6/2005 | Fay | |
| 8,151,134 B2 | | 4/2012 | Huang | |
| 8,433,838 B2 | * | 4/2013 | Crockett | G06F 13/4291 710/110 |
| 8,495,270 B2 | * | 7/2013 | Maruko | G06F 1/10 710/100 |
| 8,832,343 B2 | | 9/2014 | Decesaris et al. | |
| 8,904,078 B2 | * | 12/2014 | DeCesaris | G06F 13/4054 710/105 |
| 9,197,394 B2 | | 11/2015 | Doare et al. | |
| 9,418,037 B2 | | 8/2016 | Bacigalupo | |
| 9,514,066 B1 | * | 12/2016 | Diaz | G06F 13/102 |
| 9,658,971 B2 | * | 5/2017 | Spence | G06F 13/1642 |

(Continued)

OTHER PUBLICATIONS

Intel—Enhanced Serial Peripheral Interface (eSPI), Revision 1.0; 133 pages, Dated Jan. 2016 (Year: 2016).*

(Continued)

*Primary Examiner* — Brian T Misiura
(74) *Attorney, Agent, or Firm* — Fountainhead Law Group P.C.

(57) ABSTRACT

Ringing on the clock line on a synchronous serial data bus limits the maximum distance between the clock transmitter and receiver. The present disclosure provides a serial transmission protocol and a synchronous serial data bus for long distance serial data transmission between the clock source and the clock receiver that tolerates ringing on the transmission lines by constructing the clock signal at the receiver end of the link.

23 Claims, 8 Drawing Sheets

(56) References Cited

U.S. PATENT DOCUMENTS

| | | | |
|---|---|---|---|
| 9,934,117 B2* | 4/2018 | Zerdoum | G06F 13/00 |
| 9,959,889 B2* | 5/2018 | Clark | B23C 1/08 |
| 10,055,376 B1* | 8/2018 | Newkirk | G06F 13/4256 |
| 2008/0278223 A1* | 11/2008 | Kernahan | H03H 11/265 |
| | | | 327/538 |
| 2012/0275527 A1* | 11/2012 | Douglass | H04L 25/0272 |
| | | | 375/257 |

OTHER PUBLICATIONS

Texas Instruments Incorporated—"Extending the SPI bus for long-distance communication"; 7 pages; Dated 2011 (Year: 2011).*
Lattice Semiconductors—"Improving Noise Immunity for Serial Interface"; 7 pages, Dated Jul. 2014 (Year: 2014).*

* cited by examiner

SYSTEM AND METHOD TO TOLERATE RINGING ON A SERIAL DATA BUS

CROSS REFERENCE TO RELATED APPLICATIONS

Pursuant to 35 U.S.C. § 119(e), this application is entitled to and claims the benefit of the filing date of U.S. Provisional App. No. 62/371,807, filed Aug. 7, 2016, the content of which is incorporated herein by reference in its entirety for all purposes.

BACKGROUND

Figure 1A:
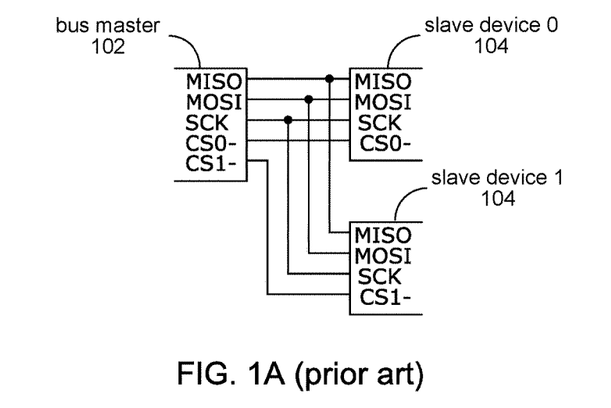
FIG. 1A illustrate devices in an SPI configuration.

The present disclosure relates to data transmission using a synchronous serial data bus. Inter-integrated circuit (I²C) and serial peripheral interface (SPI) are popular electronic data exchange protocols for serial data transmission. Consider, for example, the SPI bus. Referring to FIG. 1A, the SPI bus is defined on four signal lines, a clock signal named SCK is sent from a bus master 102 to one or more slave devices 104. The remaining SPI signals are synchronous to SCK. The bus master 102 may have a chip select signal (CS0, CS1) for each slave device 104. The bus master 102 can send data over a data line (master-out-slave-in, MOSI) to the slave devices 104. The bus master 102 can receive data from the slave devices 104 over a common data line (master-in-slave-out, MISO).

Figure 1B:
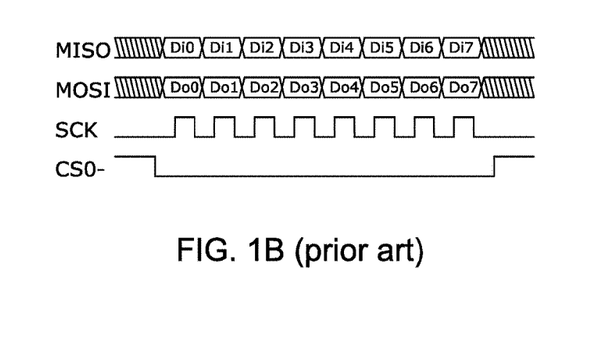
FIG. 1B is a timing diagram for SPI.

Synchronous serial data buses are often used on printed circuit boards to connect sensors to a host processor. FIG. 1A shows a typical arrangement of an SPI bus with one master device 102 and two slave devices 104. In this example, the master device 102 sends data on the MOSI line and receives data on the MISO line. Referring to the timing diagram in FIG. 1B, data is valid on the rising edge of the SCK line according to the SPI protocol, and thus data can be read in on the rising edge of SCK. A select line is dedicated to each slave device 104. The bus master 102 selects a slave device 104 by pulling the corresponding chip select line (e.g., CS0) low and activating the clock signal SCK at a suitable clock frequency. This kind of bus arrangement works well on a printed circuit board where the line lengths are relatively short. It does not work well, however, on a long cable where ringing can make data transmission unreliable.

Figure 2A:
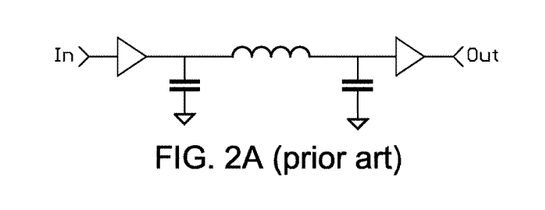
FIGS. 2A, 2B, and 2C illustrate ringing.
Figure 2B:
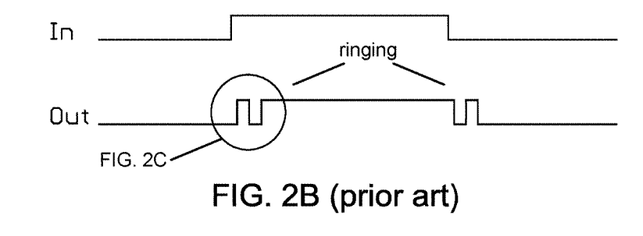
Figure 2C:
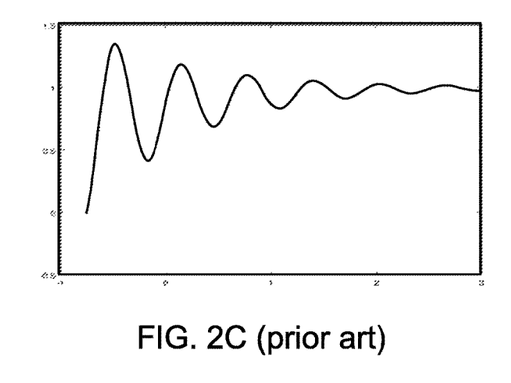

If the clock line for SCK is some distance from the clock source, ringing on the clock line can introduce spurious clock pulses on SCK, which can add unintended bits to the data stream. Ringing usually limits the distance between the clock source and the clock receiver in I²C, SPI, and other synchronous serial protocols to a few inches. Ringing is a phenomena in digital circuits in which a pulse sent over a wire can become distorted and can be received as multiple pulses. FIG. 2A depicts an electrical model of a transmission line. FIG. 2B represents an ideal digital pulse (IN), and shows what might actually appear at the output terminal (OUT) of the transmission line. Ringing is usually associated with inductance in the transmission line. The longer the transmission line, the greater the inductance in the line, and the greater is the likelihood that ringing will occur. FIG. 2C illustrates in more detail the nature of the ringing that is diagrammatically represented in FIG. 2B.

Most attempts to work around ringing do so by trying to eliminate or suppress the ringing. Solutions typically involve adding Schmitt triggers, capacitors, or impedance matching resistors at each end of the clock line. While these techniques can be effective, they have several drawbacks. In addition to adding to system cost, adding capacitors and terminating resistors limits the speed of the digital pulses. Worse yet, for these techniques to work the user needs to know the inductance of the cable carrying the pulses, and design a solution for those parameters. A given solution designed for one configuration is not likely to work in another configuration. None of these techniques adequately address ringing when dealing with cables of an unknown length or inductance.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 3:
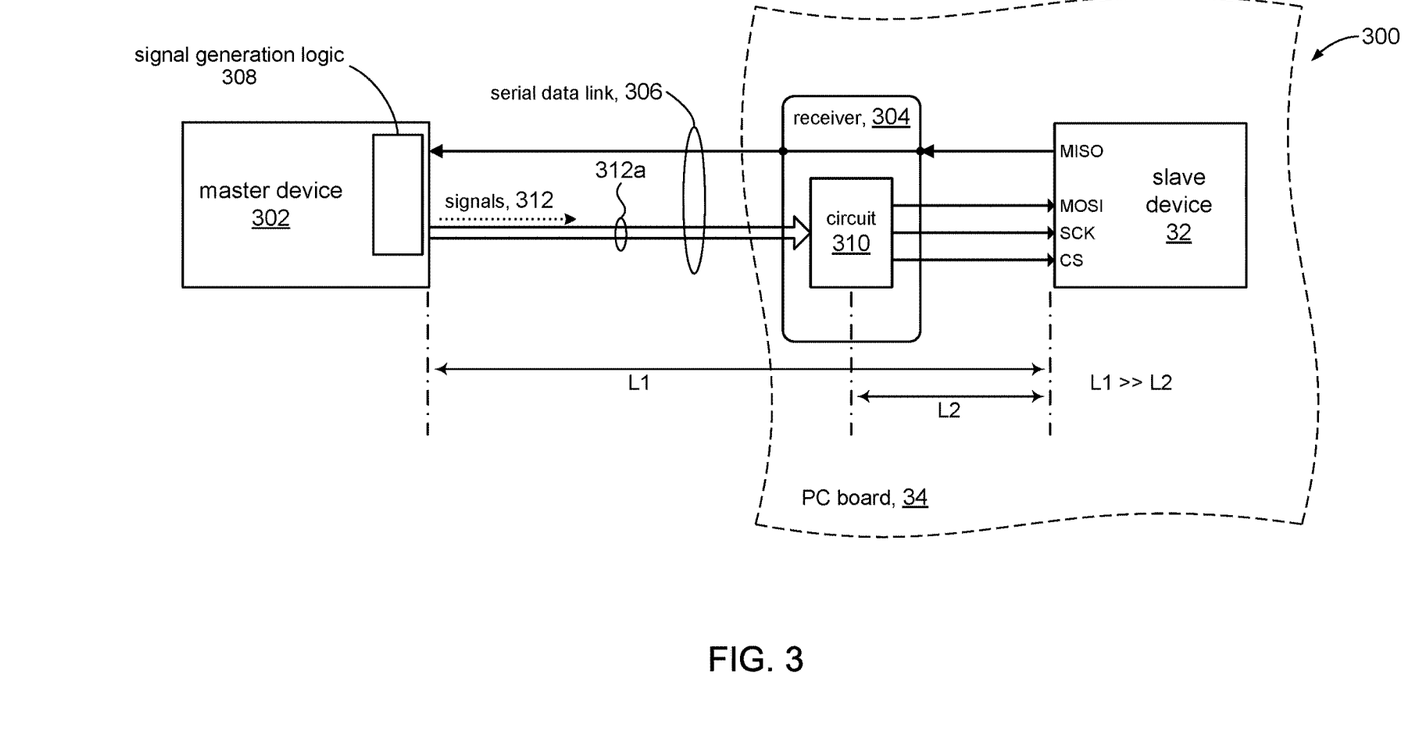
FIG. 3 shows a circuit configuration in accordance with the present disclosure.

FIG. 3 shows a system 300 for a novel signaling protocol in accordance with the present disclosure. The system 300 can include a master device 302 and a receiver circuit 304 connected to the master device 302 via a serial data link 306. In some embodiments, the master device 302 can be configured to generate signals 312 in accordance with the present disclosure that are transmitted over signal lines 312a that comprise the serial data link 306 to receiver circuit 304. In some embodiments, for example, the master device 302 can include signal generation logic 308 configured to generate the signals 312. The signal generation logic 308 can be any suitable kind of processing device, including but not limited to central processing units (CPUs), digital signal processors (DSPs), field programmable gate arrays (FPGAs), and the like.

In accordance with the present disclosure, the signals 312 can be used to generate target signals used by the slave device 32. For purposes of explanation, and without loss of generality, it can be assumed that the slave device 32 uses the SPI communication protocol. Accordingly, the target signals generated using signals 312 can comprise SPI data signals. In some embodiments, for example, the target signals can include a data signal MOSI comprising data bits directed to a slave device 32, a clock signal SCK to provide timing for reading data bits in the data signal, and a chip select signal CS to select the intended slave device 32 (in the case of multiple slave devices). It will become clear from the discussion below that signals 312 in accordance with the present disclosure are configured such that when they are transmitted on signal lines 312a of the serial data link 306, the target signals can be produced from signals 312 without being affected by any ringing that can occur on the signal lines 312a.

In accordance with the present disclosure, the receiver circuit 304 can process signals 312 received on the signal lines 312a to construct or otherwise generate the target signals. In some embodiments, for example, the receiver circuit 304 can include a sequential construction circuit 310 configured to process signals on the signal lines 312a to produce target signals MISO, CS, SCK, which can then be provided to the SPI slave device 32. The receiver circuit 304 can include an input to receive the MISO data line from the slave device 32 to transmit data to the master device 302. The receiver circuit 304 can be located close to the slave device 32. In some embodiments, for example, the receiver circuit 304 can be assembled on the same printed circuit (PC) board 34 as the slave device 32.

Signaling in accordance with the present disclosure, allows for the master device 302 to be located at a distance L1 far away from the slave device 32, yet still be able to communicate with the slave device 32 using a serial data communication protocol (e.g., SPI) that inherently requires a short separation distance L2 between the clock source (e.g., master device 302) and the clock receiver (e.g., slave device 32). Configurations using SPI, for example, typically allow for short separation distances L2 on the order of several inches or so. However, by locating the receiver circuit 304 proximate the slave device 32 (e.g., within inches from slave device 32, or on the same PC board 34, etc.), a master device 302 (clock source) using signaling in accordance with the present disclosure can be located tens to thousands of feet (distance L1) away from the slave device 32 (clock receiver).

Advantageously, signaling in accordance with the present disclosure allows for additional slave devices (not shown) to be added to the master device 302 without requiring a tedious and time consuming design cycle for additional circuitry to suppress or otherwise reduce ringing on those additional slave devices' clock lines. Likewise, signaling in accordance with the present disclosure allows the master device 302 to be used in a different application with a completely different separation distance L1 from the slave device 32 without having to design circuitry to suppress ringing.

The signals 312 represent a novel and self-contained protocol in accordance with the present disclosure. The embodiment depicted in FIG. 3 shows, in some embodiments, the master device 302 can generate the signals 312 directly (e.g., via suitable signal generation logic 308). The receiver circuit 304 serves as a protocol generator to generate SPI protocol signals from signals 312.

Figure 4:
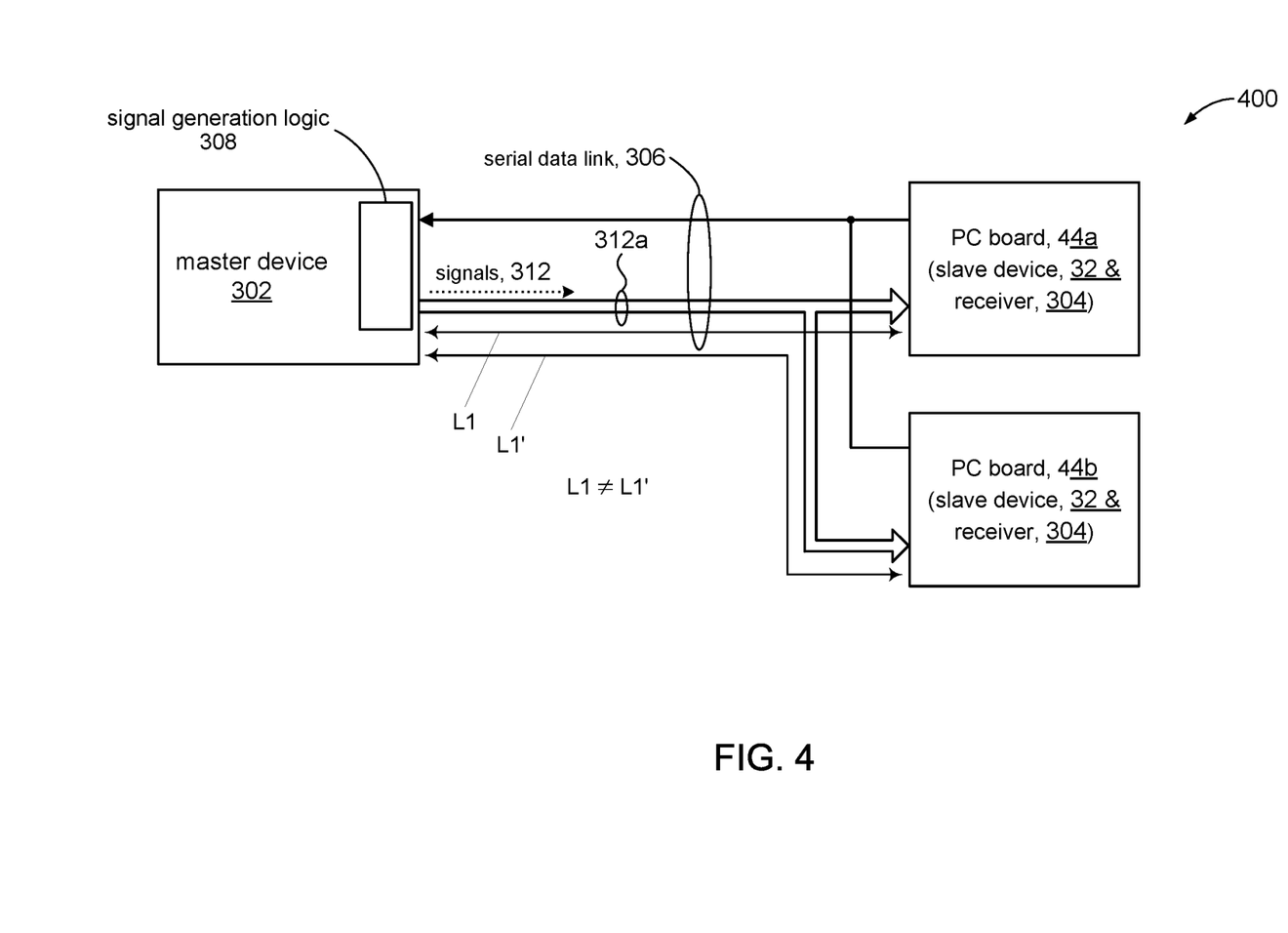
FIG. 4 shows a circuit configuration for multiple slave devices in accordance with the present disclosure.

FIG. 4 illustrates a system 400 in accordance with some aspects of the present disclosure in which master device 302 can control several different slave devices 32 via respective receivers 304 configured on separate PC boards 44a, 44b. Each PC board 44a, 44b can be at different locations from each other and at different distances (L1, L1') from master device 302.

Figure 5A:
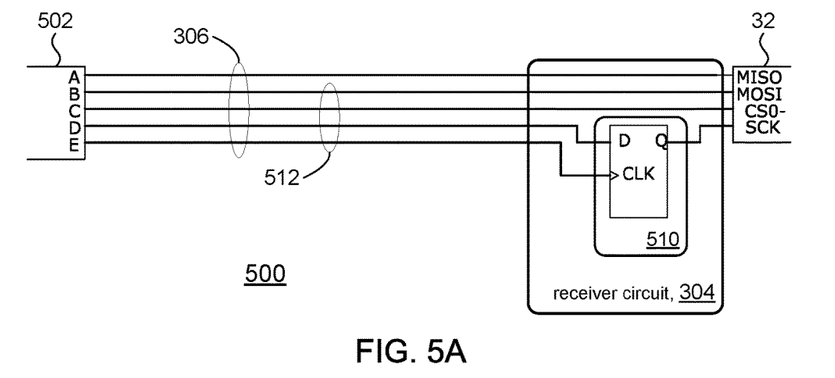
FIG. 5A is a schematic illustration of a sequential receiver circuit in accordance with some embodiments.

Referring to FIG. 5A, in some embodiments, the serial data link 306 in a system 500 can comprise an incoming signal line A (MISO) for incoming data sent from slave device 32, and outgoing signal lines B, C, D, and E for the transmission of signals 512 from a master device 502 to the receiver circuit 304. The signal line B can transmit a data signal (MOSI) from master device 502 to slave device 32. The signal line C can transmit a chip select signal (CS) to select the slave device 32. In some embodiments, the receiver circuit 304 can appear as a pass-through device with respect to signal lines A, B, and C, allowing for direct signaling between the master device 502 and slave device 32 over these signal lines.

In accordance with the some embodiments, the signal lines D and E can encode a clock signal that can be used by the slave device 32. As shown in FIG. 5A, in some embodiments, sequential construction circuit 510 can include an edge-triggered D-type flip-flop. The D and E signal lines of the serial data link 306 respectively drive the D and CLK inputs of the D-type flip-flop. The Q output of the D-type flip-flop serves as a clock signal SCK (target signal) used by the slave device 32 for reading data.

Figure 5B:
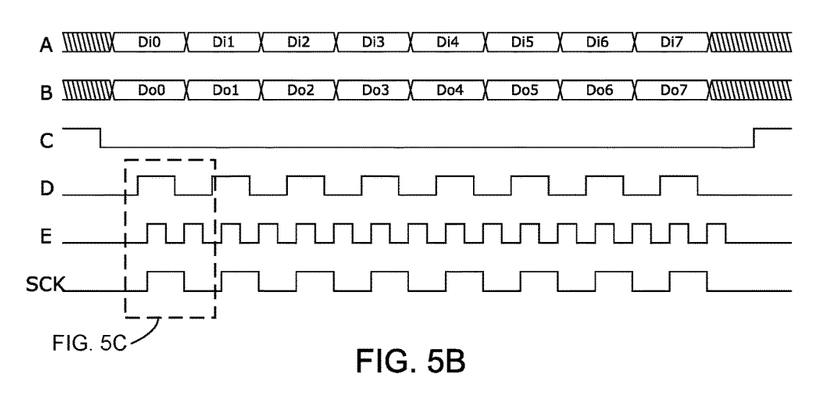
FIGS. 5B and 5C are timing diagrams of operation of the sequential receiver circuit shown in FIG. 5A.
Figure 5C:
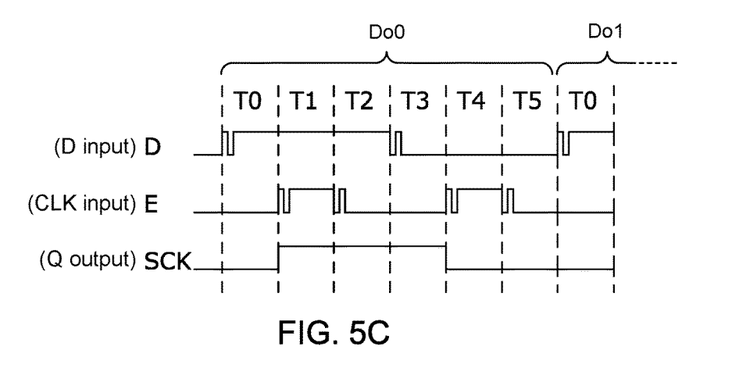

The timing diagram of FIG. 5B shows the operation of the D-type flip-flop in sequential construction circuit 510 for the transfer of one byte of data (comprising 8 bits, Do0-Do7) on the B signal line. Timing details on signal lines D and E for the transfer of one bit of data (e.g., Do0) are shown in FIG. 5C.

Operation of the D-type flip-flop comprising sequential construction circuit 510 will be explained in connection with the timing details shown in FIG. 5C, and with reference to the D and CLK inputs and the Q output of the D-type flip-flop. As noted above, signals transmitted by the master device 102 on the D signal line appear on the D input of the D-type flip-flop. Similarly, signals transmitted by the master device 102 on the E signal line appear on the CLK input of the D-type flip-flop. The Q output of the D-type flip-flop serves as the SCK clock signal for the slave device 32.

Data at the D input of the flip-flop is copied to the Q output of the D-type flip-flop on each rising edge of the CLK input. At time period T1, the D input transitions LO to HI. Note that the CLK input is LO during the transition, so any ringing on the D input will not affect the Q output. When the LO to HI transition occurs at the CLK input, the D input is at steady state. The D input is copied to the Q output and the Q output transitions from LO to HI. As long as the D input remains constant, the Q output remains constant despite any ringing (e.g., on the E signal line) that may appear on the CLK input during time period T1. At time period T2, the CLK input transitions LO, and because the D input is still HI, any ringing during the transition will not affect the Q output.

Any ringing that occurs when the D input transitions HI to LO at time period T3 will not affect the Q output because the CLK input is LO. At time period T4, the Q output transitions HI to LO when the CLK input transitions from LO to HI since the D input is now LO at this time, and the Q output remains constant LO despite any ringing that may appear at the CLK input during the transition. Likewise, any ringing at the CLK input when it transitions HI to LO during time period T5 will not affect the Q output because the D input is still LO.

Note that ringing during transitions on the D input (or the CLK input) is tolerated as long as the CLK input (or the D input) remains constant during the transitions. As can be seen in FIGS. 5B and 5C, the Q output (and hence the SCK clock signal) does not exhibit ringing despite the presence of ringing on either or both the D and CLK inputs.

FIG. 5C shows that in some embodiments, the frequency of the SCK clock signal can be controlled by controlling the occurrence of the rising edges of pulses at the CLK input of the D-type flip-flop (i.e., on the E signal line) relative to when the steady HI and steady LO states occur on the D input of the D-type flip-flop (i.e., the D signal line).

Figure 6A:
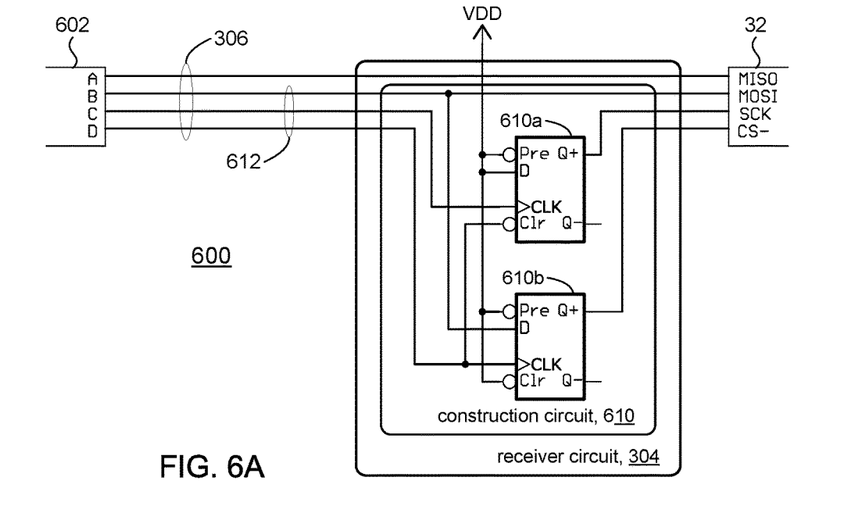
FIG. 6A is a schematic illustration of a sequential receiver circuit in accordance with some embodiments.

Referring now to FIG. 6A, in some embodiments, the serial data link 306 for a system 600 can comprise four signal lines for the transmission, as compared to the serial data link 306 shown in FIG. 5A which uses five signal lines. The four signal lines in the serial data link 306 shown in FIG. 6A can include an incoming signal line A (MISO) for incoming data sent from slave device 32, and outgoing signal lines B, C, and D for the transmission of signals 612 from a master device 602. In accordance with embodiments of the present disclosure, signals on the B, C, and D signal lines can be used to generate the MOSI, CS, and SCK target signals at the slave device end. In some embodiments, for example, the B signal line can transmit a composite signal from the master device 602 to generate a data signal (the data bits) and a chip select signal at the receiver circuit 304. The C and D signal lines can transmit construction signals from the master device 602 to the receiver circuit 304.

In accordance with some embodiments, the construction signals on the C and D signal lines can be combined with the composite signal on the B signal line to generate a chip select signal (CS) and a clock signal (SCK). Importantly, the generated chip select signal and a clock signal exhibit no ringing despite ringing on any one, two, or all of the B, C, and D signal lines. Further in accordance with some embodiments, the clock signal can be used by the slave device 32 to sense or otherwise extract data bits from composite signal on the B signal line.

In some embodiments, sequential construction circuit 610 can include a pair of D-type flip-flops 610a, 610b. The C and D signal lines can be connected to the flip-flop 610a as shown to generate the clock signal (e.g., on the Q output) using the construction signals transmitted on the C and D signal lines. The B and D signal lines can be connected to the flip-flop 610b as shown to generate the chip select signal (e.g., on the Q output) using the composite signal on the B signal line and the construction signal on the D signal line.

When asserted LO, the preset (Pre) and clear (Clr) inputs on the flip-flops 610a, 610b force both their Q outputs and the Q- outputs HI. The preset and clear inputs are asynchronous with respect to the CLK inputs; the flip-flop outputs change immediately on transition of either the preset input or the clear input.

Figure 6B:
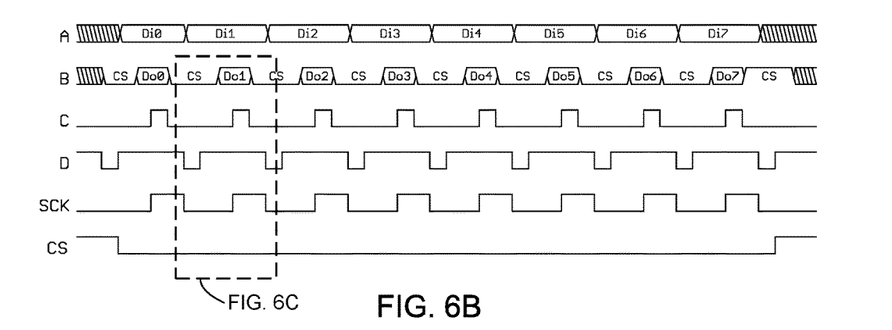
FIGS. 6B, 6C, and 6D are timing diagrams of operation of the sequential receiver circuit shown in FIG. 6A.
Figure 6C:
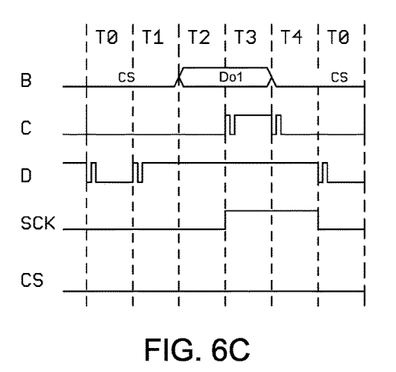

FIG. 6B shows the signaling during the transfer of one byte (eight bits, Do0-Do7) of data in accordance with the present disclosure. In some embodiments, the composite signal on the B signal line comprises chip select pulses multiplexed with data bit pulses. The chip select pulses are LO during the transfer, and each data bit pulse can be HI or LO. Timing details on signal lines B, C, and D for the transfer of one bit of data (e.g., Do1) is shown in FIG. 6C.

Operation of the sequential construction circuit 610 will now be described in connection with the timing details shown in FIG. 6C. At power-up or at the start of a transfer, the master device 602 can lower (e.g., assert LO) the C signal line, which will hold the Q output of flip-flop 610a (and hence the SCK input of the slave device 32) LO.

During time period T0, the master device 602 can lower the D signal line. Any ringing that may occur on the D signal line during a HI to LO transition will not result in any spurious transfers because: (1) SCK is LO by virtue the C signal line on the CLK input of flip-flop 610a, so slave device 32 will not clock in any data on the MISO input; and (2) the output of flip-flop 610b drives the CS input of slave device 32 which only selects or deselects the device and does not directly participate in the data transfer.

In accordance with the present disclosure, the master device 602 will assert a HI or LO chip select signal (CS value) for slave device 32 on the B signal line during time period T0. In this example, since the slave device 32 is receiving data, the mater device 602 will assert LO on the B signal line to select the slave device 32 per the SPI protocol.

During time T1, the master device 602 can raise (assert HI) the D signal line to latch the state of the B signal line to the output of flip-flop 610b (and hence to the CS input of the slave device 32). In this example, the B signal line is LO in order to select the slave device 32. Since the B signal line is latched to the output of flip-flop 610b on the rising edge of the D signal line, any ringing on D has no effect on the output of flip-flop 610b, and hence no effect on the CS input of slave device 32. Since the C signal line is still LO, any ringing on the flip-flop 610a will not cause any data on the MISO input to be clocked in.

During time period T2, the master device 602 can assert data bit Do1 on the B signal line, thus multiplexing the CS signal and a data bit signal for data bit Do1 on the B signal line. Ringing on the B signal line can be tolerated because neither of the flip-flops 610a, 610b is clocked during time period T2.

At time period T3, the master device 602 raises the C signal line. This latches a logic "1" at the D input of flip-flop 610a to the SCK input of the slave device 32. In response to SCK going HI, the slave device 32 clocks in its MOSI input (connected to the B signal line), which contains the data bit Do1. Since the D input of flip-flop 610a is latched to the SCK input of the slave device 32 on the rising edge of the C signal line, any ringing on C has no effect on the SCK input.

At time period T4, the master device 602 switches the B signal line back to the CS value and lowers the C signal line. Ringing on the C signal line is tolerated since any ringing will simply re-latch a logic "1" into the SCK input to the slave device 32, which is already HI from time period T3. Any ringing on the B signal line during the transition from a data bit signal to CS value will not be erroneously read by the slave device 32 because the SCK input is at a steady HI during time period T4 (data is read on the rising edge of SCK).

At the end of time period T4, the master device 602 can lower the D signal line. This resets the flip-flop 610a and so the SCK input of slave device 32 goes LO. Ringing on line D can occur and will be tolerated because once the flip-flop 610a is reset, additional reset pulses (e.g., due to ringing) will have no effect on the SCK input of slave device 32 (it stays LO). Likewise, any clocking of CS into flip-flop 610b due to ringing in the D signal line has no effect since the output of the flip-flop is already set to the CS value.

It can be appreciated from the description of FIG. 6C that ringing on any one or more of the B, C, and D signal lines can occur during transmission and will not affect the data that is clocked in by the slave device 32. Ringing on the B, C, and D signal lines is therefore tolerated.

Figure 6D:
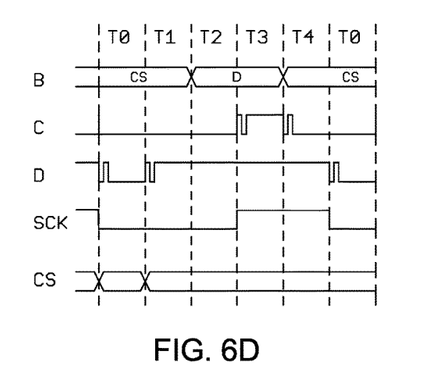

FIG. 6D illustrates a generic transfer of the SCK and CS signals, when CS can be HI or LO depending on who the master device 602 selects or deselects a slave device when transferring data in a multiple slave device configuration. Referring to FIG. 4, for example, the CS signal to slave device 0 would be LO when the master device 602 wants to select and transfer data to slave device 0, and the CS line to slave device 1 would be HI so as to deselect that slave device.

Figure 7A:
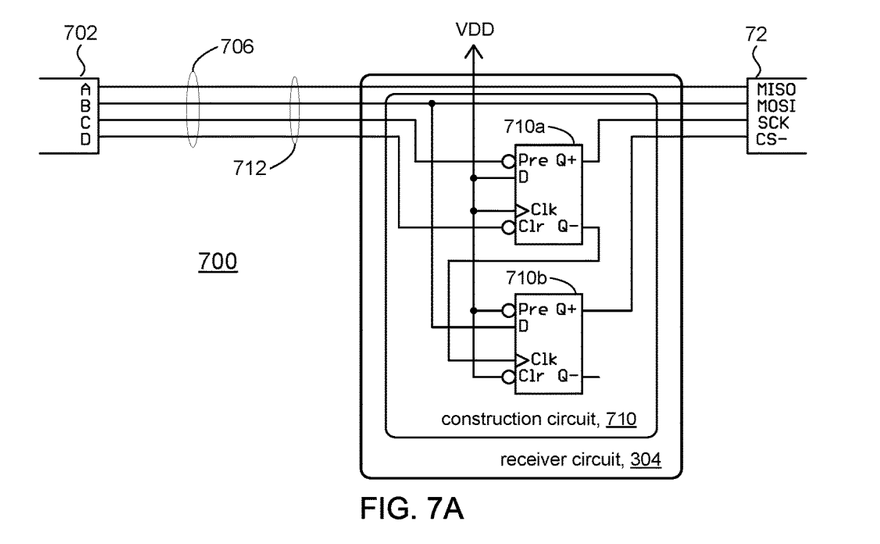
FIG. 7A is a schematic illustration of a sequential receiver circuit in accordance with some embodiments.

Referring now to FIG. 7A, in some embodiments, the serial data link 706 for a system 700 can comprise four signal lines for the transmission, similar to system 600 shown in FIG. 6A. The four signal lines in the serial data link 706 shown in FIG. 7A can include an incoming signal line A (MISO) for incoming data sent from slave device 72, and outgoing signal lines B, C, and D for the transmission of signals 712 from a master device 702. In accordance with embodiments of the present disclosure, signals on the B, C, and D signal lines can be used to generate the MOSI, CS, and SCK target signals at the slave device end. In some embodiments, for example, the B signal line can transmit a composite signal that encodes a data signal and a chip select signal from the master device 702 to the receiver circuit 304. The C and D signal lines can transmit construction signals from the master device 702 to the receiver circuit 304.

In accordance with some embodiments, the construction signals on the C and D signal lines can be combined with the composite signal on the B signal line to generate a chip select signal (CS) and a clock signal (SCK). Importantly, the generated chip select signal and a clock signal exhibit no ringing despite ringing on any one, two, or all of the B, C, and D lines. Further in accordance with some embodiments, the clock signal can be used by the slave device 72 to sense or otherwise extract data bits from the data signal portions of the composite signal on the B signal line.

In some embodiments, the sequential construction circuit 710 can include a pair of D-type flip-flops 710a, 710b. The C and D signal lines can be connected to the flip-flop 710a as shown to generate the SCK clock signal (e.g., on the Q output) using the construction signals transmitted on the C and D signal lines. The B signal line can be connected to the flip-flop 710b as shown to generate the CS chip select signal (e.g., on the Q output) using the composite signal on the B signal line and the construction signal on the D signal line.

When asserted LO, the preset (Pre) and clear (Clr) inputs on the flip-flops 710a, 710b force both their Q outputs and the Q- outputs HI. The preset and clear inputs are asynchronous with respect to the CLK inputs; the flip-flop outputs change immediately on transition of either the preset input or the clear input.

Operation of the sequential construction circuit 710 will now be described in connection with the timing details shown in FIG. 7B. At power-up, the master device 702 asserts signals C and D HI. At the start of a transfer in time period T1, the master device 702 can lower (e.g., assert LO) the C signal line, which sets flip-flop 710a and holds the Q output of flip-flop 710a (and hence the SCK input of the slave device 72) HI.

In accordance with the present disclosure, the master device 702 will assert a HI or LO chip select signal (CS value) for slave device 72 on the B signal line during time periods T2 and T3. During time period T2, the master device 702 can raise the C signal line. Any ringing that may occur on the C signal line only serves to set an already HI flip-flop output and so the ringing has no effect on the already set Q output on flip-flop 710a. Any ringing that may occur as the B signal line transitions to the desired CS state is tolerated since the B signal is not latched as CS until the falling edge of SCK. In time periods T2 and T3 signal B is set LO to cause CS to transition LO in time period T3. The transition of CS to LO represents the start of an SPI transfer.

During time period T3, the master device 702 can lower (assert LO) the D signal line to latch the state of the B signal line to the output of flip-flop 710b (and hence to the CS input of the slave device 72). In this example, the B signal line is LO in order to select the slave device 72. Ringing on the D signal line is tolerated since flip-flop 710a sees ringing as multiple attempts to clear an already cleared flip-flop. When flip-flop 710a is cleared, its Q- output goes HI. Since Q- of flip-flop 710a is connected to the clock line of flip-flop 710b, the flip-flop latches the B signal (CS) as D transitions LO.

Some SPI devices require a short pause between device selection (CS going LO) and the first SCK pulse. An analog-to-digital converter, for example, might use this pause to complete the ADC conversion and make the ADC reading ready for the SPI transfer. This pause is depicted in FIG. 7B as time periods Tw and expanded in FIG. 7C. During these wait periods, SCK remains LO and no data is transferred. Signal D may remain LO or transition HI during the wait periods. With respect to system 600 in FIG. 6A, wait periods can be added by repeating the signals present during time period T2 as shown in FIG. 6C. Wait periods are optional and their presence or absence depends on the timing requirements of the particular slave device. The actual data transfer begins after the completion of any optional wait periods.

Figure 7B:
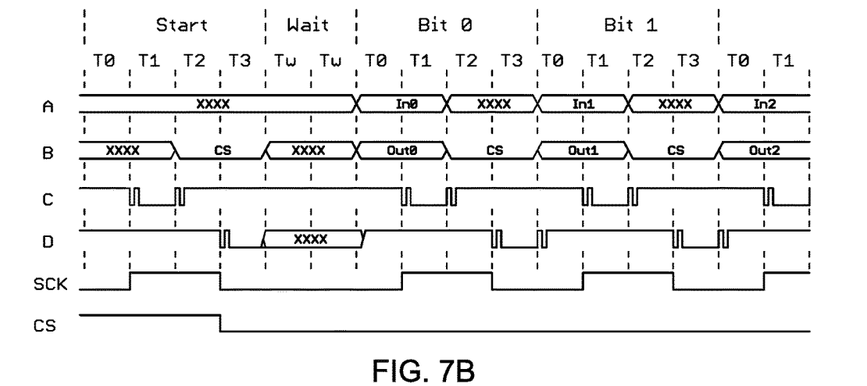
FIGS. 7B and 7C are timing diagrams of operation of the sequential receiver circuit shown in FIG. 7A.

Continuing with FIG. 7B, consider the transfer of Bit 0. The transfer starts in time period T0 with signal B set to the desired output data bit value. Ringing on signal B is tolerated since the B value is not latched while the ringing is occurring. In time period T1, the B signal remains stable at the Bit0 value, and signal C transitions LO. As signal C transitions LO, the Q output of flip-flop 710a transitions HI. Ringing on signal C is tolerated since the Q output is set on first negative transition of B and any ringing only tries to set an already set output. The rising edge of SCK transfers signal B (Out0) into the slave device as MOSI, and transfers signal A (In0) into the master device as MISO. Signal B is set LO (the current value of CS) during time period T2 and remains LO during time period T3. Signal D transitions LO at the start of time period T3. This clears flip-flop 710a and its output Q- transitions to HI. Ringing is tolerated on signal D since once the flip-flop 710a is cleared, subsequent multiple attempts to clear it again will have no effect. The Q- output of flip-flop 710a is connected to the clock input of flip-flop 710b and as flip-flop 710a transitions HI, the value on signal B (CS) is latched into the Q output of flip-flop

710b. Signal D transitions HI at the end of time period T3. Ringing on signal D has no effect on the Q output of flip-flop 710a, and so there is no effect on SCK.

Figure 7C:
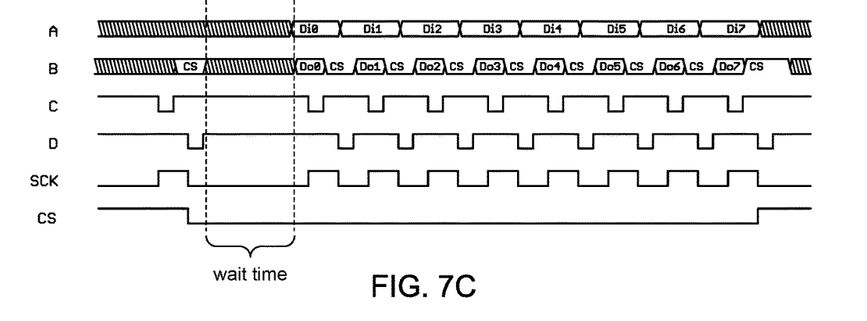

FIG. 7C shows the signaling during the transfer of one byte (eight bits) of data in accordance with the present disclosure using the circuit logic of FIG. 7A. In some embodiments, the composite signal on the B signal line comprises chip select pulses multiplexed with data bit pulses. The chip select pulses are LO during the transfer, and each data bit pulse can be HI or LO. Timing details on signal lines B, C, and D for the transfer of one bit of data (e.g., Do1) is shown above in FIG. 7B.

Figure 8:
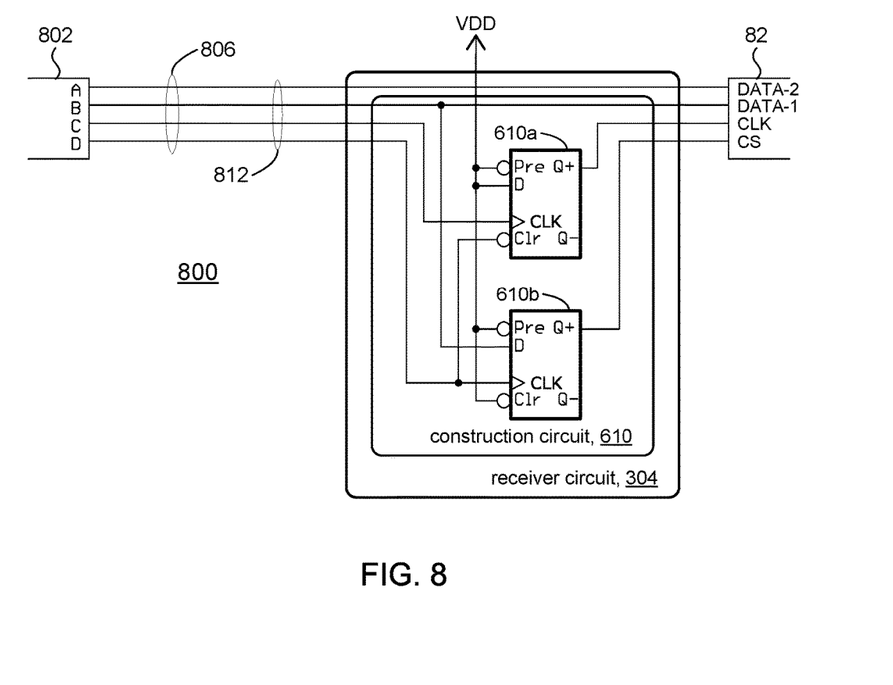
FIG. 8 is a schematic illustration of a sequential receiver circuit in accordance with some embodiments.

Referring to FIG. 8, the discussion will now turn to a description of a novel serial data transfer protocol in accordance with some embodiments of the present disclosure. FIG. 8 shows a system 800 comprising a master device 802 which can provide additional data capacity for transferring data to a slave device 82. A serial data link 806 in system 800 can comprise four signal lines A, B, C, D for transferring signals 812 in accordance with some embodiments of the protocol of the present disclosure. More particularly, unlike the previously described embodiments, all four signal lines A, B, C, D of serial data link 806 can be used for transmitting signals 812 from the master device 802 to the slave device 82. The slave device 82 can have two data-in lines DATA-1, DATA-2, a clock signal CLK, and a chip select CS.

The master device 802 can generate signals on the B, C, and D signal lines as previously described in connection with operation of the sequential construction circuit 610 in FIG. 6A. For example, the B signal line can transmit a composite signal that encodes a data signal and a chip select signal from the master device 802 to the receiver circuit 304. The C and D signal lines can transmit construction signals from the master device 802 to the receiver circuit 304. The receiver circuit 304 can combine signals on the C and D signal lines with the composite signal on the B signal line to generate a chip select signal (CS) and a clock signal (CLK).

In accordance with some embodiments, the master device 802 can put data on the A signal line in addition to putting the data on the B signal line. In some embodiments, this can provide for CS and three data bits to be sent for each CLK pulse. The slave device 82 can use the generated clock signal CLK to sense or otherwise extract data bits from the data signal portions of the composite signal on the B signal line, as explained above, and from the A signal line.

Figure 9:
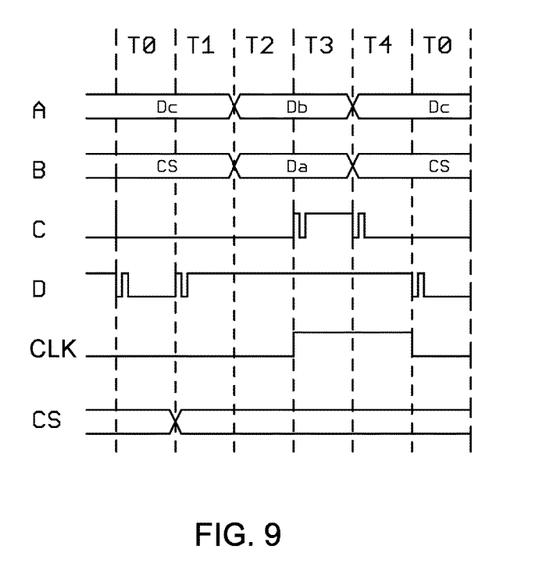
FIG. 9 is a timing diagram of operation of the sequential receiver circuit shown in FIG. 8 in accordance with some embodiments.

FIG. 9 shows timing details for a configuration of signals on the A, B, C, and D signal lines for the embodiment depicted in FIG. 8. The B signal line contains data bit Da multiplexed with a chip select signal, and the A signal line contains two data bits Db, Dc. The slave device 82 can read the Da bit on the B signal line and the Db bit on the A signal line on the rising edge of CLK (during time period T3, for example). The Dc bit can be read on the falling edge of CLK (during time period T4, for example). In some embodiments, the A and B signal lines can be tri-stated to allow for bi-directional flow, so the data bits can be either outputs from master device 802 or inputs to master device 802.

Although FIG. 8 shows only one A signal line, one of ordinary skill will appreciate that in other embodiments, one or more additional A-type signal lines (e.g., A', A", etc., not shown) for carrying data can be provided to send additional bits of data. Referring again to FIG. 9, for example, on the rising edge of CLK at time period T3, the slave device 82 can read additional data bits provided on the additional signal lines (e.g., A', A", etc., not shown), in addition to reading data bits on the A and B signal lines as described above; and likewise, on the falling edge of CLK in time period T4.

As explained in connection with FIG. 9, in some embodiments, adding more signal lines (e.g., A', A", etc., not shown) to the system 800 in FIG. 8 can provide more data across the data bus. In accordance with other embodiments, the system 800 in FIG. 8 can provide additional data capacity using signaling on the C and D signal lines.

Figure 10:
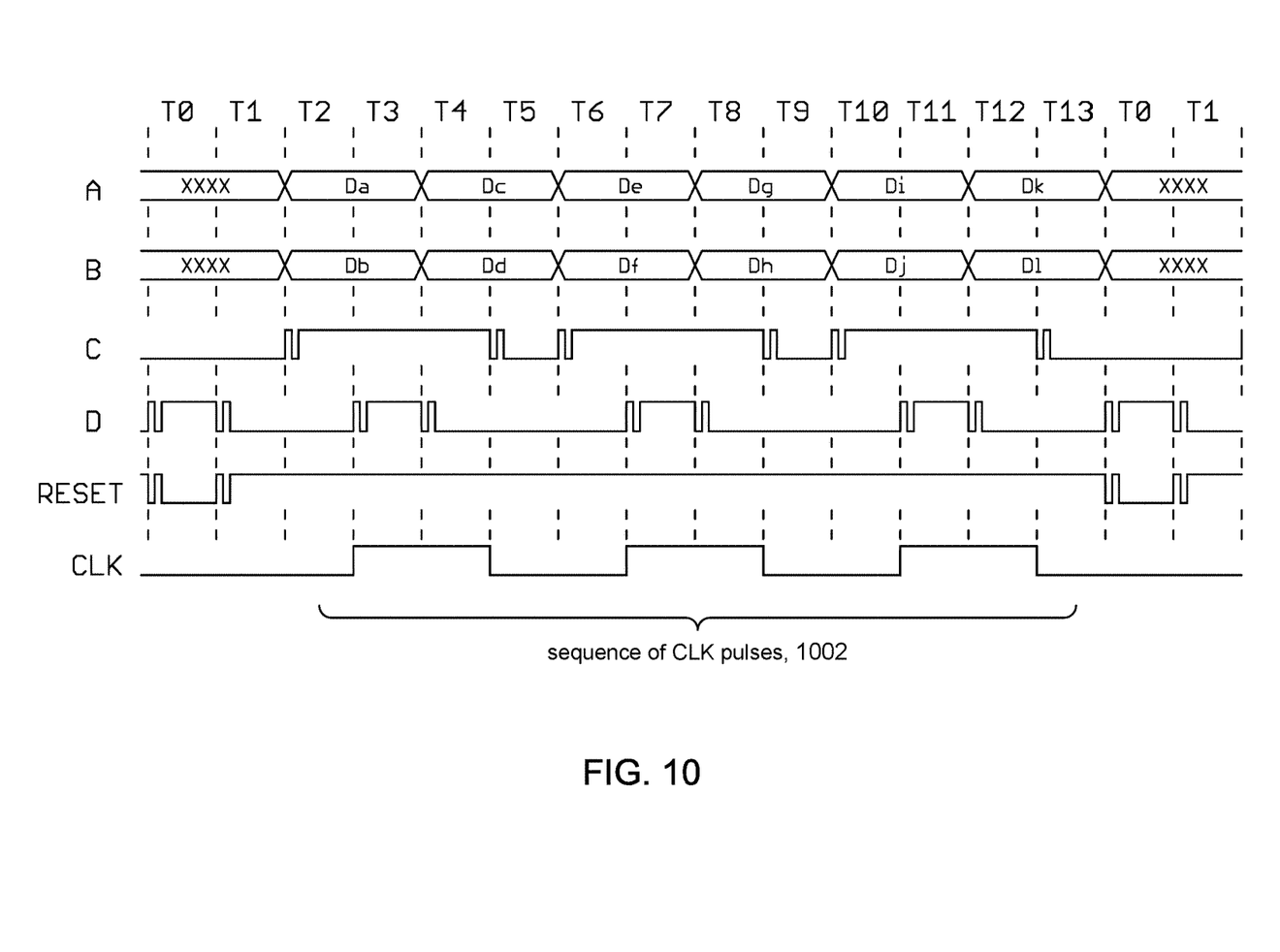
FIG. 10 is a timing diagram of operation of the sequential receiver circuit shown in FIG. 8 in accordance with some embodiments.

In some embodiments, for example as shown in FIG. 10, additional data bits can be sent over the A and B signal lines (as compared to the embodiments illustrated in FIG. 9) by using a sequence of clock (CLK) pulses generated by appropriate signaling in the C and D signal lines. As can be seen in FIG. 10, for example, in some embodiments the C and D signal lines can carry signals used to generate a sequence 1002 of CLK pulses. Different bits are available on the rising and falling edge of each clock pulse in the sequence 1002. Data on the A and B signal lines can be read by the slave device 82 on the rising edges of the CLK pulses 1002 (e.g., at the beginning of time periods T3, T7, T11), and on the falling edges of the CLK pulses (e.g., at the beginning of time periods T5, T9, T13).

FIG. 10 shows a sequence 1002 of three clock pulses and the transfer of twelve data bits using both A and B as data signals. It can be appreciated, however, that the sequence 1002 can be extended to include more clock pulses and hence to accommodate more data. Ringing on the C and D signal lines is tolerated as explained above.

The sequence 1002 can be reset by an otherwise unused combination of the C and D signal lines, such as seen in time period T0 in FIG. 10 for example. In some embodiments, for example, the C and D signal lines can be combined to produce a RESET signal line (not shown). For example, the C and D signal lines can be AND'd together using an AND gate (not shown) with an inverting input for the C signal line to realize the expression $\overline{C}$ &D. The RESET signal line can be used by the slave device 82 to know when a sequence has begun; for example, the RESET signal line can reset a counter in the slave device 82. The RESET signal clears the counter and each subsequent clock pulse increments the counter. Note that simply AND'ing the C and D signal lines will pass any ringing on the D signal line to the RESET signal line. However, ringing is allowed on the RESET signal line since resetting the counter multiple times has the same effect as resetting it once.

Embodiments in accordance with the present disclosure describe logic (e.g., 308) in a master device that employs a novel signaling protocol to generate signals (e.g., 312) and a construction circuit (e.g., 310) to construct conventional SPI signals at the slave device. It some applications, where the master device is already generating signals using a conventional SPI protocol, an encoder circuit may be provided to encode, translate, or otherwise convert conventional SPI signals to signals using the novel signaling protocol of the present disclosure. The construction circuit can then serve as a decoder to recover the SPI signals at the slave device. Such an encoder circuit can allow for legacy master and slave devices that use SPI or other similar distance-limited protocols (e.g., $I^2C$) to communicate across distances beyond the limits imposed by the technology underlying those protocols.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method for serial communication with a device, the method comprising:
   causing a sending device to transmit to the device a plurality of first signals that do not include any signals according to the SPI protocol or to the I2C protocol, the plurality of signals including a composite signal, a first construction signal, and a second construction signal, the sending device:
      transmitting the composite signal to the device on a first signal line;
      transmitting the first construction signal to the device on a second signal line separate from the first signal line; and
      transmitting the second construction signal to the device on a third signal line separate from the first signal line and the second signal line;
   wherein a device enable signal to select the device is produced using the first construction signal and the composite signal;
   wherein a clock signal is produced using only the first and second construction signals, wherein the clock signal can be used by the device to read a plurality of data bits from the composite signal.

2. The method of claim 1, wherein transmissions on the first, second, and third signal lines may include ringing, wherein the clock signal produced from the first and second construction signals is absent ringing despite any ringing on the first, second, and third signal lines.

3. The method of claim 1, further comprising encoding a select signal with the plurality of data bits to produce the composite signal, the device enable signal based on the encoded select signal.

4. The method of claim 1, further comprising combining the first construction signal and the composite signal using a D-type flip-flop to produce the device enable signal.

5. The method of claim 1, further comprising combining the first and second construction signals using a circuit to provide functionality of a D-type flip-flop to produce the clock signal.

6. The method of claim 1, further comprising receiving data from the device on a fourth signal line separate from the first, second, and third signal lines.

7. The method of claim 1, further comprising transmitting a data signal to the device on a fourth signal line separate from the first, second, and third signal lines, wherein the device uses the clock signal to sample the first signal line and the fourth signal line.

8. The method of claim 7, wherein the device senses a data bit on the first signal line and a data bit on the fourth signal line on a rising edge of the clock signal.

9. The method of claim 8, wherein the device senses a data bit on the fourth signal line on a falling edge of the clock signal.

10. The method of claim 1, further comprising transmitting a plurality of data pulses to the device on a fourth signal line separate from the first, second, and third signal lines, wherein the device uses a rising edge of the clock signal to sample the first signal line and the fourth signal line and a falling edge of the clock signal to sample the first signal line and the fourth signal line.

11. A circuit for communicating with a device, the circuit comprising:
   a first terminal to receive a composite signal;
   a second terminal to receive a first construction signal;
   a third terminal to receive a second construction signal, wherein the composite signal, the first construction signal, and the second construction signal are not signals according to the SPI protocol or to the I2C protocol;
   first means for generating a device enable signal from the composite signal and the first construction signal and outputting the device enable signal onto a device enable line of the device; and
   second means for generating a clock signal from the first and second construction signals and outputting the clock signal onto a clock line of the device without any ringing on the clock line despite there being ringing in either or both the first and second construction signals,
   wherein the composite signal is provided to a first data line of the device,
   wherein the device, in response to detecting the device enable signal on the device enable line, samples the first data line using the clock signal to read data bits from the composite signal.

12. The circuit of claim 11, wherein the first means comprises a first D-type flip-flop and the device enable signal is an output of the first D-type flip-flop, wherein the second means comprises a second D-type flip-flop and the clock signal is an output of the second D-type flip-flop.

13. The circuit of claim 11, further comprising a fourth terminal to receive a data signal from the device via a second data line of the device.

14. The circuit of claim 11, further comprising a fourth terminal to receive a data signal, the fourth terminal to output the data signal on a second data line of the device.

15. The circuit of claim 14, wherein the device, in response to detecting the device enable signal on the device enable line, samples the first data line and the second data line on rising edges of the clock signal to read data bits on the first data line and data bits on the second data line.

16. The circuit of claim 15, wherein the device further samples the second data line on falling edges of the clock signal to read data bits on the second data line.

17. The circuit of claim 16, wherein the device further samples the first data line on falling edges of the clock signal to read data bits on the first data line.

18. A system for providing serial communication with a device, the system comprising:
   a signal generator to produce first, second, and third signals, wherein the first, second, and third signals are not signals according to the SPI protocol or to the I2C protocol;
   first, second, and third signal lines having respective first ends connected to the signal generator to transmit, respectively, the first, second, and third signals to respective second ends of the first, second, and third signal lines, wherein one or more of the first, second, and third signal lines may exhibit ringing; and
   a construction circuit connected at the second ends of the first, second, and third signal lines to generate a device enable signal and a clock signal using the first, second, and third signals, the construction circuit having a first output for the generated device enable signal and a second output for the generated clock signal, wherein the generated clock signal does not exhibit ringing, wherein the generated clock signal is used to sample the first signal line to sense the data signal.

19. The system of claim 18, further comprising wherein the construction circuit comprises a first D-type flip-flop to generate the device enable signal and a second D-type flip-flop to generate the clock signal.

20. The system of claim 18, further comprising a fourth signal line separate from the first, second, and third signal lines to receive a data signal from the device.

21. The system of claim 18, further comprising a fourth signal line separate from the first, second, and third signal lines to transmit a second data signal, wherein the generated clock signal is used to sample the first signal line and the fourth signal line to sense data on both the first and the fourth signal lines.

22. The system of claim 21, wherein data on the first and fourth signal line are sensed on rising edges of the generated clock signal.

23. The system of claim 21, wherein data on the first and fourth signal line are sensed on rising edges of the generated clock signal and on falling edges of the generated clock signal.

\* \* \* \* \*